(12) United States Patent
Moriwake (10) Patent No.: US 9,232,208 B2
(45) Date of Patent: Jan. 5, 2016

(54) SYSTEMS AND METHODS FOR DETECTING IMAGE PROPERTIES

(75) Inventor: Katsuakira Moriwake, Tokyo (JP)

(73) Assignee: SONY CORPORATION, Tokyo (JP)

( * ) Notice: Subject to any disclaimer, the term of this patent is extended or adjusted under 35 U.S.C. 154(b) by 767 days.

(21) Appl. No.: 13/441,424

(22) Filed: Apr. 6, 2012

(65) Prior Publication Data

US 2012/0257063 A1 Oct. 11, 2012

(30) Foreign Application Priority Data

Apr. 8, 2011 (GB) .................................. 1105972.2

(51) Int. Cl.
| | | |
|---|---|---|
| *H04N 7/18* | (2006.01) | |
| *H04N 13/00* | (2006.01) | |
| *H04N 13/02* | (2006.01) | |

(52) U.S. Cl.
CPC ....... *H04N 13/0025* (2013.01); *H04N 13/0037* (2013.01); *H04N 13/0239* (2013.01); *H04N 2013/0077* (2013.01)

(58) Field of Classification Search
USPC ........................................................ 348/156
See application file for complete search history.

(56) References Cited

U.S. PATENT DOCUMENTS

| 6,276,799 | B1 | 8/2001 | Van Saarloos et al. | |
|---|---|---|---|---|
| 2006/0152528 | A1* | 7/2006 | Oh ................................ | 345/594 |
| 2011/0037829 | A1* | 2/2011 | Hata ............................. | 348/43 |
| 2011/0123112 | A1* | 5/2011 | Zhang .......................... | 382/168 |
| 2012/0050492 | A1 | 3/2012 | Moriwake | |

FOREIGN PATENT DOCUMENTS

| JP | 6-54350 | 2/1994 |
|---|---|---|
| JP | 2002-345000 | 11/2002 |

OTHER PUBLICATIONS

U.S. Appl. No. 13/209,905, filed Aug. 15, 2011, Moriwake.
United Kingdom Search Report issued Jul. 20, 2011, in Patent Application No. GB1105972.2 filed Apr. 8, 2011.

* cited by examiner

*Primary Examiner* — Dave Czekaj
*Assistant Examiner* — Leron Beck
(74) *Attorney, Agent, or Firm* — Oblon, McClelland, Maier & Neustadt, L.L.P.

(57) ABSTRACT

An image property detection apparatus for processing a pair of images representing different respective views of a scene to generate a color property difference amount, comprises a difference detector configured to derive a difference amount dependent upon an average of the differences in color properties between the pair of images at each of a set of possible image colors, each weighted by the image content of at least one of the pair of images at that respective image color.

20 Claims, 5 Drawing Sheets

SYSTEMS AND METHODS FOR DETECTING IMAGE PROPERTIES

CROSS REFERENCE TO RELATED APPLICATION

The present application claims the benefit of the earlier filing date of United Kingdom patent application 1105972.2 filed in the United Kingdom Intellectual Property Office on 8 Apr. 2011, the entire contents of which application are incorporated herein by reference.

BACKGROUND

1. Field of the Disclosure

This invention relates to image property detection.

2. Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor implicitly admitted as prior art against the present invention.

Three dimensional (3D) television has recently been made available to the consumer, and it is expected that the amount of 3D equipment and programming will increase rapidly in the next few years.

3D television relies on a stereoscopic technique whereby pairs of images are captured by respective cameras which are laterally displaced (i.e. substantially in a horizontal image direction) by a certain distance, for example a typical spacing of a user's eyes. The pairs of images therefore represent slightly different views of the same scene; in general they will encompass the same items within the scene (except perhaps at the image extremities) but the relative positions of the items between the two images will depend on the distance of the items from the camera arrangement.

When the images are displayed, it is important that each of the user's eyes sees (at least mainly) a respective one of the image pair. In practice this is achieved in various ways, such as by the user wearing polarising, time multiplexing or colour-filtering spectacles, or by the television screen itself being provided with a special lens arrangement which diverts each of the two images to a respective eye position of the viewer. Of these, the colour-filtering technique, common in early attempts at 3D cinema, is not generally used in 3D television technology.

Returning to the 3D camera system, each of the pair of images is captured by an independent camera, with its own lens and image capture arrangement (for example a CCD arrangement). But in order to maintain the 3D illusion for the viewer, it is important that the two images of each image pair are closely matched in terms of their colour and related properties. Various colour parameters are available to the operator of a professional video camera or an external colour correction unit, such as the gamma, knee, white level and black level parameters, but the task of setting up a 3D camera arrangement is significantly more difficult than that of setting up a conventional (single) video camera because of the need not only to set the parameters correctly for the current scene, but also to set the parameters so that the two cameras forming the 3D camera arrangement generate images with identical image properties. In the case of a domestic video camera, the range of adjustments available to the user is much more limited, making it even more difficult to set the two cameras to provide identical colour properties.

SUMMARY

The foregoing paragraphs have been provided by way of general introduction, and are not intended to limit the scope of the following claims. The described embodiments, together with further advantages, will be best understood by reference to the following detailed description taken in conjunction with the accompanying drawings.

This invention provides an image property detection apparatus for processing a pair of images representing different respective views of a scene to generate a colour property difference amount; the apparatus comprising a difference detector configured to derive a difference amount dependent upon an average of the differences in colour properties between the pair of images at each of a set of possible image colours, each weighted by the image content of at least one of the pair of images at that respective image colour.

The invention recognises that even though the images captured by the two cameras of a 3D camera arrangement will (deliberately) be slightly different, because the images represent substantially the same scene their colour properties can be assumed to be substantially the same. However, across the different colours of the images and across different brightness levels within each colour, it can be very hard to quantify a single difference amount representing differences in colour properties between the pair of images. The invention elegantly and conveniently provides such a difference measure, which can be used (for example) as part of a quality assessment of an incoming 3D television signal.

In embodiments of the invention, the apparatus comprises a colour property detector arranged to detect colour properties of images captured by each of the image capturing devices, and the colour properties detected by the colour property detector represent the distribution of pixel brightness in each of a set of primary pixel colours. In this way, an automated statistical analysis of the pixel colour values can be used to detect differences in colour properties between the two images.

In embodiments of the invention, the colour properties detected by the colour property detector comprise, for each of the set of primary or component pixel colours, a histogram of pixel brightness in that colour with respect to a set of brightness intervals or bins. In order to reduce the quantity of data that needs to be handled and compared, in embodiments of the invention at least some of the intervals encompass more than one possible pixel brightness value.

The histogram data can in fact vary between images that, to the viewer, would look subjectively the same. This is because the generation of the histograms can place pixels with almost identical colour values into different histogram intervals, just because the colour values fall either side of the boundary between two such intervals. In order to reduce such effects, two further features are provided, either or both of which may be adopted. One such potential feature is to provide a low pass filter for smoothing the histograms generated in respect of the pair of images prior to the detection of differences between the histograms, thereby reducing any artificial peaks or troughs in the histogram data caused by the histogram analysis. Another such potential feature is to provide a noise combiner for combining a noise signal with images to be provided to the difference detector. In this way, random, pseudo-random or other noise is added to the pixel data before the histogram analysis takes place, which can have the effect of distributing pixels, which are closely spaced either side of a histogram interval boundary, more evenly into histogram intervals either side of the boundary.

Embodiments of the invention recognise that the two images captured by a 3D camera arrangement are almost but not quite identical, so in embodiments of the invention the colour property detector is arranged to detect colour properties in respect of a sub-area of each of the pair of corresponding images—for example, a central area of each image can be used, as that central area is more likely to be found in the other of the two images. In embodiments of the invention, the respective sub-areas of the pair of images are displaced with respect to one another so as to represent substantially the same features of the scene.

The colour property detection and balancing process described above can be carried out on "live" video, that is to say, on successive image pairs. In embodiments of the invention, however, the apparatus comprises an image store for storing the pair of images, so that the colour balancing operation can be carried out on a specific pair of images, and the resulting colour property adjustment settings can then be used on subsequent live video.

In embodiments of the invention the apparatus is operable to carry out one or more trials of different colour property adjustment parameters, in order to seek a set of parameters which results in a difference in colour properties less than a threshold amount.

The invention also provides a camera system comprising a pair of image capturing devices arranged with respect to one another so as to capture images representing different respective views of a scene; and apparatus as defined above. In embodiments of the invention the image capturing devices are video cameras, which may be laterally displaced from one another, substantially in a horizontal image direction, so as to generate respective three-dimensional image pairs.

Further respective aspects and features of the invention are defined in the appended claims. Features of one aspect of the invention (for example an apparatus) are equally applicable to other aspects of the invention (for example a method).

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, in which.

DESCRIPTION OF THE EMBODIMENTS

Figure 1:
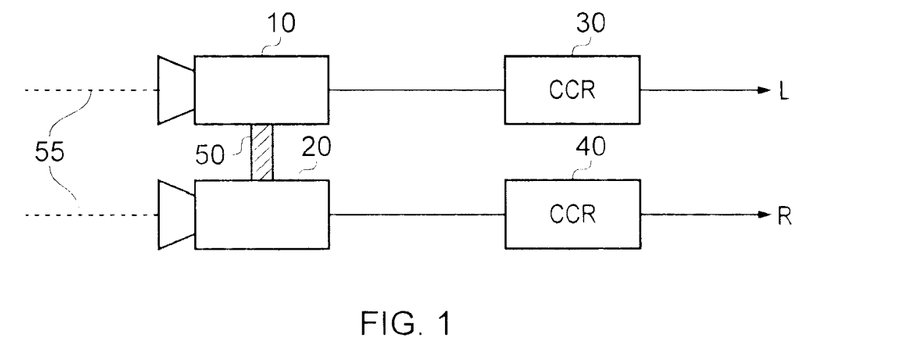
FIG. 1 schematically illustrates a 3D camera arrangement with manual colour correction.

Referring now to the drawings, for comparison with the prior art, FIG. 1 schematically illustrates a 3D camera arrangement or system with independent manual colour correction, or colour property adjustment.

In FIG. 1, two video cameras 10, 20 are provided. Video signals from each camera are supplied to a respective colour corrector (CCR) 30, 40 for manual colour property adjustment. The adjusted video signals represent left (L) and right (R) video signals of a 3D video signal.

In order to provide 3D operation, the cameras 10, 20 are held in a laterally displaced relationship by a mechanism (shown generically in FIG. 1 as a bracket 50) which maintains the cameras a certain distance apart. The separation of the centres of the lens systems of the two cameras could be equal to an average eye separation (for example 8 cm), though other separations can be used for various artistic effects in the final 3D video. The cameras are normally separated laterally, i.e. along a horizontal image direction, so as to capture images representing different respective views of a scene. The cameras are also synchronised together, in terms of their video capture timing (for example by being supplied with a common video synchronisation signal, not shown) and also in terms of their nominal zoom, focus and exposure settings.

The cameras can be arranged at a very small angle (in the horizontal plane) with respect to one another so that the optical axes 55 of the two cameras converge at a certain distance in front of the cameras. For example, this distance in front of the cameras might be 20 m, so it will be understood that for a lateral separation of a moderate number of cm, the convergence angle (the amount by which the optical axes of the cameras deviate from a parallel relationship with one another) will be very small, generally much less than one degree.

The colour correctors 30, 40 use known technology to adjust colour properties of the respective images. For example, the colour correctors can adjust the following properties in respect of each primary colour (for example Red, Green and Blue) of the video signal: white level, black level, gamma and knee. That is to say, the colour corrector 30 applies a set of parameters to the red component of the video signal generated by the camera 10, another (potentially different) set of parameters to the green component of the video signal generated by the camera 10, and a third (potentially different again) set of parameters to the blue component of the video signal generated by the camera 10. The colour corrector 40 does a similar function, though with potentially entirely different parameters, in respect of components of the video signal generated by the camera 20.

The white level, black level, gamma and knee parameters will be described further below. These are just example parameters, however, and the skilled person will understand that colour correctors may operate in different ways to achieve a desired adjustment of the colour properties of an image or of a video signal.

It will be appreciated that the colour correctors 30, 40 shown in FIG. 1 may be included within the respective camera bodies. It will also be appreciated that the amount and quality of adjustment provided by the colour correctors can depend on the cost and target market of the cameras. So, for example, domestic video cameras may have much less capable colour correction facilities, or even no user-adjustable colour correction at all. High-end professional video cameras are likely to have more comprehensive and higher quality colour correction facilities.

Figure 2:
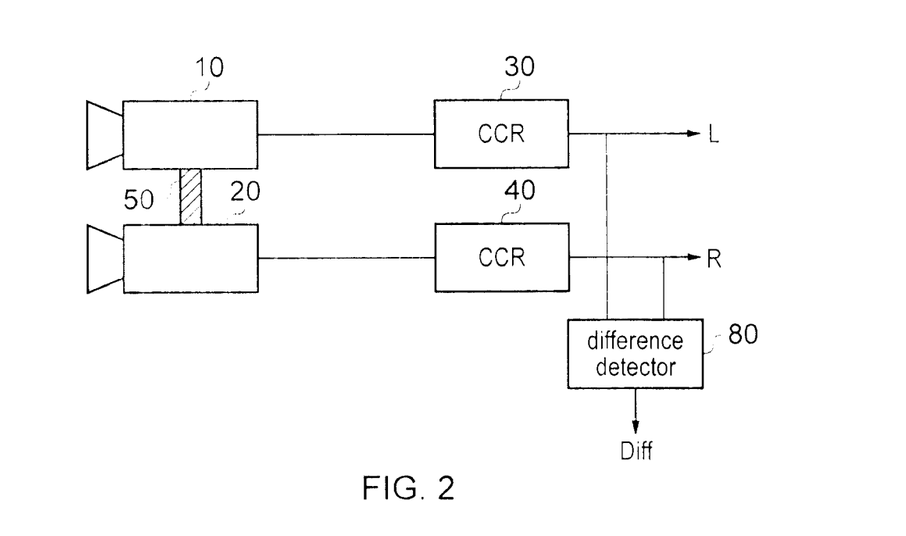
FIG. 2 schematically illustrates a 3D camera arrangement with an image property difference detector according to an embodiment of the invention.

FIG. 2 schematically illustrates a 3D camera arrangement with a colour property difference detector 80 acting on the two video streams generated by the two cameras. The arrangement can be considered as a pair of cameras and a 3D image property detection apparatus.

The difference detector 80 detects differences in the colour properties of pair of images of the L and R video streams. In particular, and as will be discussed below, the difference detector derives a colour property difference amount dependent upon an average of the differences in colour properties between the pair of images at each of a set of possible image colours, each weighted by the image content of at least one of the pair of images at that respective colour. Accordingly, from detected differences between the two images, the difference detector 80 generates a amount indicating an amount of colour property deviation between the two video streams. The operation of the difference detector will be described further with reference to FIG. 4 below.

The amount generated by the difference detector can be used in a manual or automated feedback arrangement, so that adjustments to one or both of the CCRs 30, 40 are initiated in order to tend to reducing the colour property difference (as detected by the difference detector) towards zero. This can be handled in real time, that is, during "live" operation of the camera arrangement, or during a calibration phase from a buffered sample pair of images so that, after the adjustments have been derived, the adjustments are applied to subsequent images or pairs of images. If a calibration phase is used, it can be initiated by the user, or can be initiated in response to the apparatus being powered up or rebooted, or could take place periodically. If required, the "live" stream of images from the cameras can be arranged to bypass the difference detector during the calibration phase. Accordingly, the difference detector can act as a colour property adjustment detector configured to detect degrees of colour property adjustment required to adjust one (or both) of the pair of images so as to reduce the differences in colour properties between the pair of images.

Alternatively, the amount generated by the difference detector 80 can be used as a quality indication of the 3D video signals received from the cameras 10, 20.

The difference detector 80 can also be applied to video signals not directly received from a pair of cameras, such as (by way of non-limiting examples):
 a. computer-generated or computer-augmented video streams
 b. video-processed or edited video streams
 c. video streams recorded onto and replayed from a recording medium
 d. video streams provided by a third party, for example for broadcast Accordingly, the cameras 10, 20 and the CCRs 30, 40 are illustrated merely to provide a technical context for the discussion of the role and operation of the difference detector. They are not essential to the present embodiments.

Figure 3:
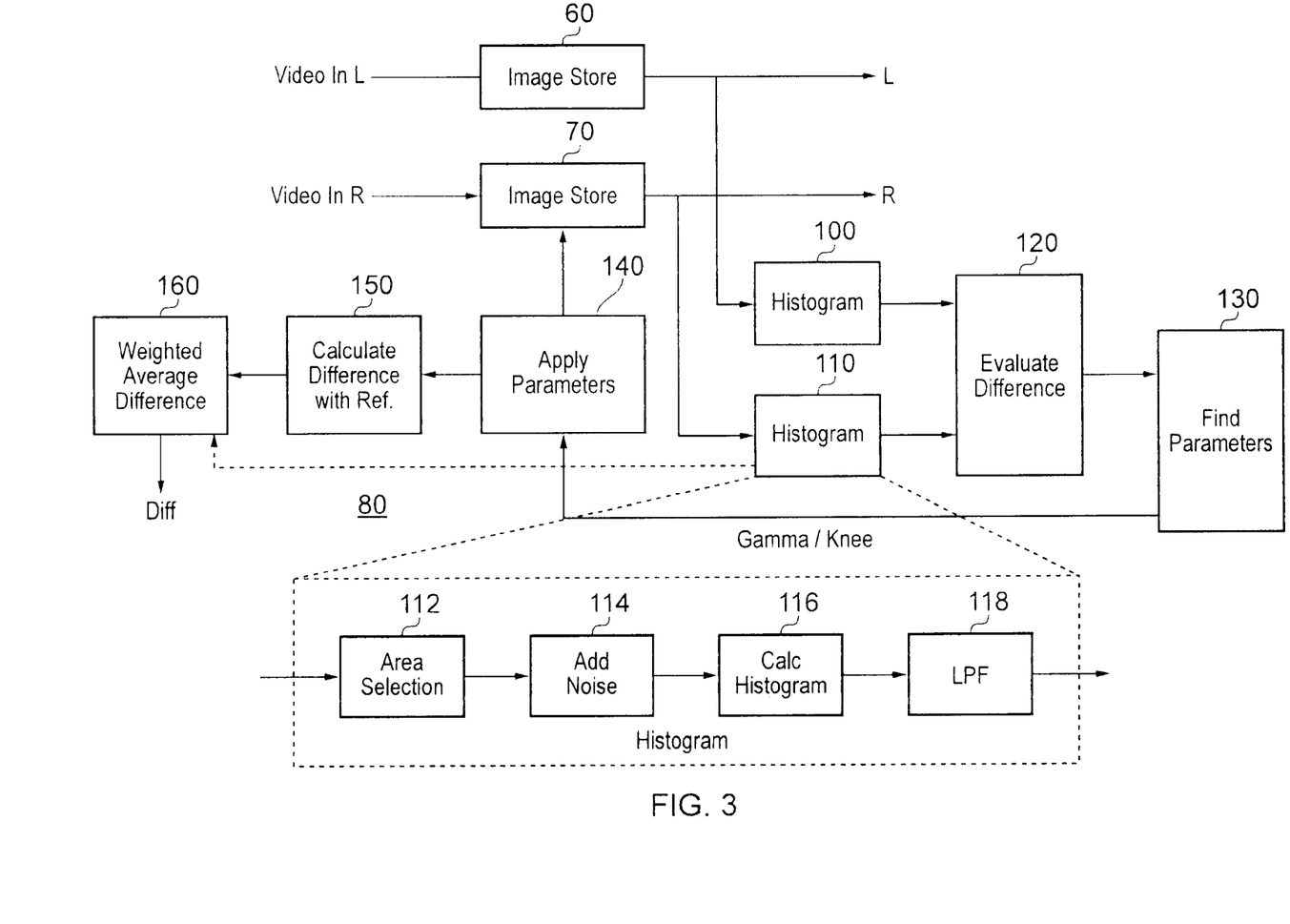
FIG. 3 schematically illustrates an image property detection apparatus.

FIG. 3 schematically illustrates an image property detection apparatus, and in particular the difference detector 80 of FIG. 2 and its interaction with the CCRs 30, 40.

The difference detector 80 comprises a pair of image stores 60, 70, a pair of histogram detectors 100, 110 collectively acting as a colour property detector, a difference evaluator 120, a parameter finder 130, a parameter application unit 140, a reference difference calculator 150 and a weighted average calculator 160.

Figure 4:
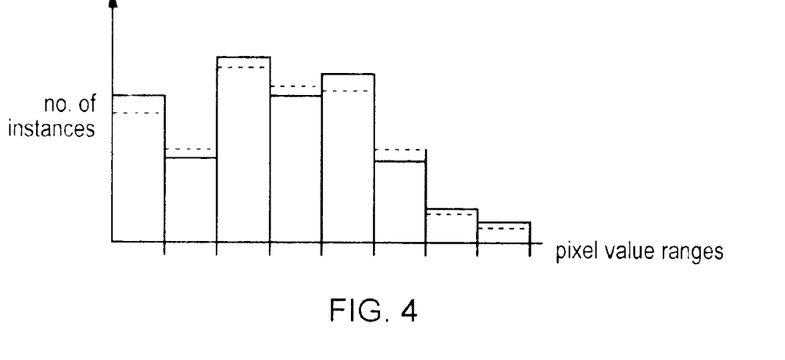
FIG. 4 is a schematic example histogram.

The histogram detectors 100, 110 each act on a respective video stream (L, R) and detect the distribution of pixel brightness values in each of the three primary colour (red, green and blue, or R, G and B) streams. Of course, if video formats other than RGB are used, then the histogram detectors could act on the relevant streams of those formats instead. An example histogram is shown in FIG. 4 for one such stream (for example the red stream of the L video channel) in solid line and another such stream (for example the corresponding red stream of the R video channel) in dashed line. This illustrates (a) that pixel values across the image (or a selected part of the image) are allocated to pixel value intervals (bins) and the number of instances of pixels within each such interval is detected, and (b) there can be positive and negative differences between corresponding histograms of the two video channels, at different bin numbers within the histogram; this means that assessing an objective "difference" value to characterise the colour difference between the two video channels is not a straightforward task.

The histogram intervals may each encompass one pixel value or more than one possible pixel value, the latter arrangement being partly to reduce the data processing requirements of the subsequent comparison, and partly to smooth the resulting histogram data so as to reduce the detection of differences where the viewer would not be able to see a difference. The intervals need not be of the same extent within a particular histogram, though in the present example identically sized intervals are used. It is useful, however, that the intervals used in each pair of histograms for comparison (for example the red histogram of the L channel and the red histogram of the R channel) are the same. In the present example, 256 equally spaced intervals are used, so in the case of 10-bit (1024 possible values) per colour video, each interval encompasses 4 possible pixel values.

Figure 5:
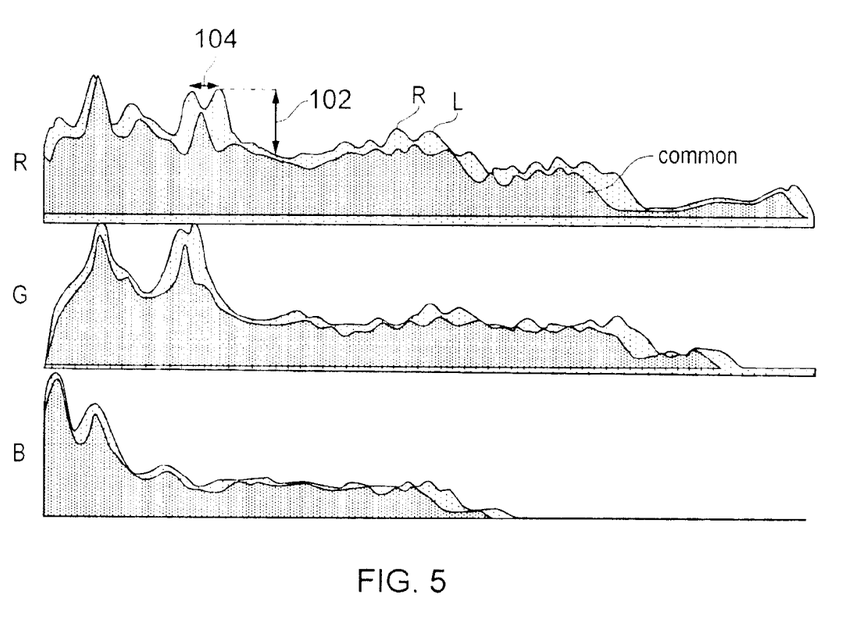
FIG. 5 schematically illustrates differences between corresponding histogram pairs.

FIG. 5 shows an overlay of histograms of example left and right channel images, for the three respective colour signals R, G and B. For each of the three histogram pairs, the lighter shaded part is the histogram of the left channel image, the darker shaded part is of right channel image and the black part is a common area between the left and right channel histograms.

A difference between the two histograms for a colour signal could be directly represented by the subtraction of the histograms at a particular bin (102 in FIG. 5). The comparator 122 in FIG. 6 (to be described below) may operate in this manner. As an alternative, the difference between the histograms may be derived as the difference of the index or bin numbers of similar shapes of peaks in the histogram (104 in FIG. 5). This is similar in many ways to the detection of the difference 156 to be described with reference to FIG. 10 below. As the index or bin number is actually related directly to the video level, the difference of the index numbers represents the difference of the video levels between corresponding peaks.

Returning to FIG. 3, in order to detect the histograms, each histogram detector 100, 110 comprises an area selector 112, a noise adder 114, a histogram calculator 116 and a low pass filter 118.

The area selector 112 operates to select an area or sub-area of the image over which the histogram is to be calculated. This may be a central area as a sub-portion of the whole image area (both (a) because the edges of a stereo pair of images will often be different and (b) to reduce the processing requirement), and the areas may be offset laterally (in a horizontal image direction) so as generally to encompass substantially the same parts of the scene. The amount of the offset can be set in advance as a value (for example 20 pixels) which will tend to result in corresponding parts of the scene falling within the two selected areas. Or the offset can be derived by an image matching process which identifies corresponding image features. Or the offset can be derived using a function of the cameras' current zoom and/or focus and/or separation and/or convergence angle parameters. Note that the selected areas are used for the purpose of detecting differences, but any colour property differences are, in embodiments of the invention, considered to apply to the whole of the respective image.

Of course, the calculations described here could take place with respect to the whole of the respective images, which is to say that the area selector 112 may not in fact be needed.

Noise is then added to the selected areas by the noise adder 114. The noise can be random, pseudo-random or other types, and is added to the pixel values in each of the red, green and blue streams, for example either (a) with an average (for example a root mean square) amplitude of 1 (in the pixel value scale), or (b) with an amplitude which is related to the size of the histogram intervals—for example one half of the interval size. The intention behind adding the noise is to avoid the situation that pixels which appear very similar or identical to the viewer (for example pixels separated by one in the pixel value scale) fall into different histogram intervals and so lead to the generation of correction differences which would otherwise be inappropriate. Adding the noise means that such pixels adjacent to the boundary of two intervals will be randomly placed into intervals either side of the boundary.

The histogram is then calculated by the histogram calculator 116 in a conventional way, using the defined intervals.

Finally, the low pass filter 118 applies a smoothing to the histogram so as to tend to reduce large variations between the detected numbers of instances in adjacent intervals. This is done, prior to the detection of differences between the histograms, for generally the same reason as the noise was added by the noise adder 114, to avoid (or reduce the amount of) differences being detected in response to artificial effects caused by pixels falling just to one side or the other of an interval boundary.

Figure 6:
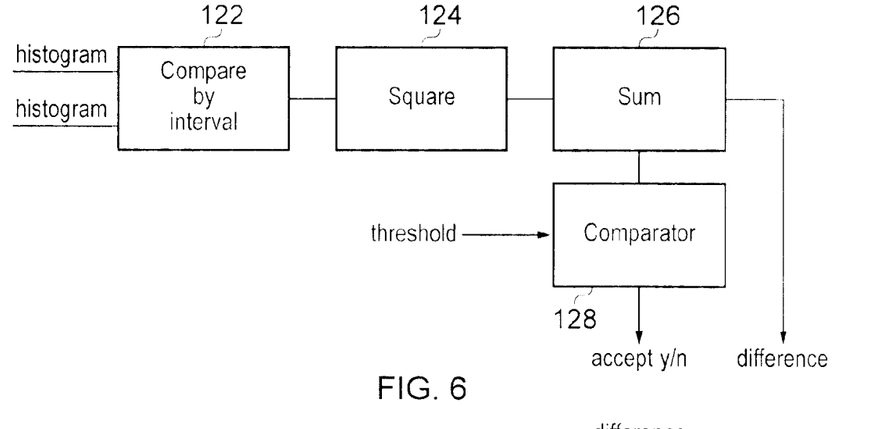
FIG. 6 schematically illustrates the operation of a difference evaluator.

FIG. 6 schematically illustrates the operation of the difference evaluator 120. This operation comprises comparing two corresponding histograms (in respect of the same colour stream, one from each of the L & R channels) on an interval-by-interval basis 122, squaring the differences obtained for each interval 124, and summing the squares 126. This generates a single difference value in respect of that pixel colour component stream. The single difference value may then be output or stored (if the system is searching for the lowest such difference—see below) or may be compared 128 with a threshold value (if the system is seeking the first set of parameters to arrive at a difference below the threshold value).

Figure 7:
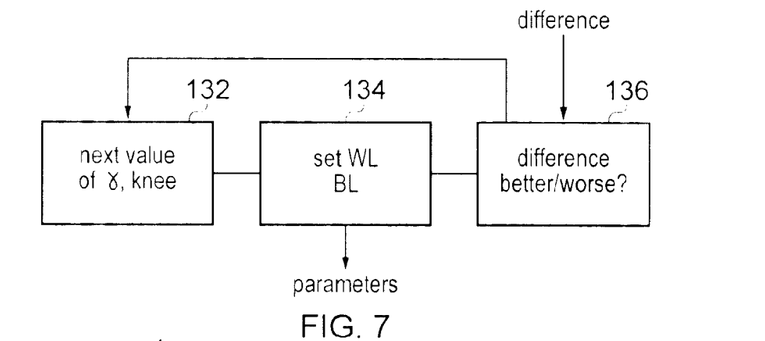
FIG. 7 schematically illustrates the operation of a parameter finder and parameter calculator.

FIG. 7 schematically illustrates the operation of the parameter finder 130 and the parameter application unit 140.

With reference to a parameter search strategy set out in the description of FIG. 9 below, the parameter finder identifies (132) the next value of the gamma and knee parameters to be tested in accordance with the search strategy. From these, the parameter calculator 140 derives (134) the white and black level parameters in a known manner, and these four parameters are applied by the parameter application unit 140 to the image stored in the R channel image store 70. Histograms are derived from the output of the image store 70, after that modification, and are again tested by the apparatus of FIG. 6 to derive a difference value. A test (136) of whether that difference value is better (smaller) or worse (larger) than previously achieved difference values is used to steer the next selection of values (132).

Figure 8:
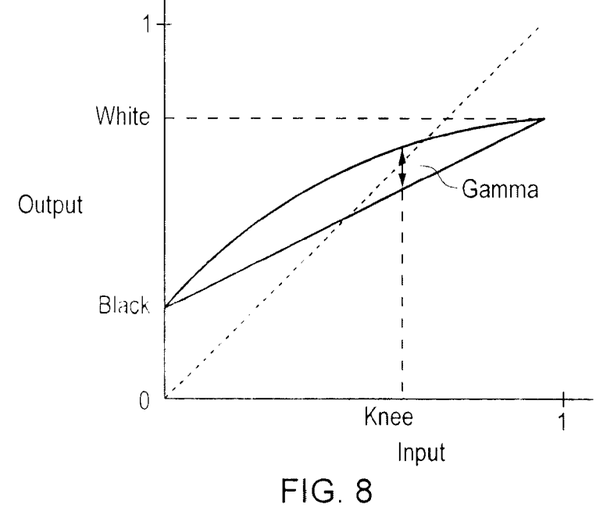
FIG. 8 schematically illustrates the knee, gamma, black level and white level parameters.

FIG. 8 schematically illustrates the knee, gamma, black level and white level parameters, in terms of a mapping function between input pixel value and output pixel value. These are conventional parameters used in CCRs or CCUs, and are applied by the parameter application unit in a conventional manner. The white level is the highest pixel value amongst the output pixel values (it is referred to as "white" even though the mapping may be applied to individual ones of component streams such as the red, green and blue streams). The black level is the lowest pixel value amongst possible output values. The gamma and knee values define a non-linear relationship between input and output pixel values.

Figure 9:
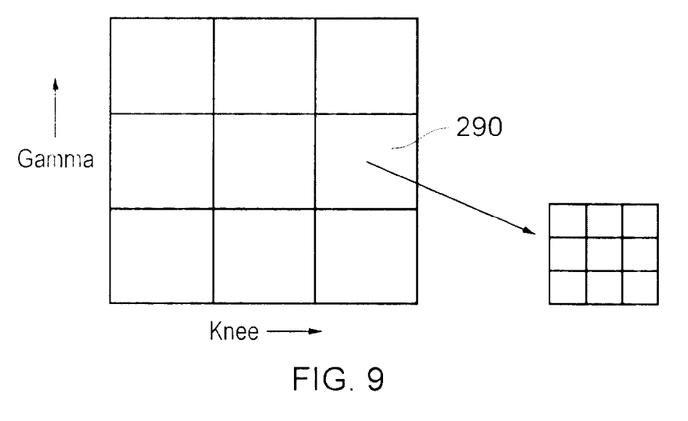
FIG. 9 schematically illustrates a parameter search strategy.

FIG. 9 schematically illustrates a parameter search strategy. The search is a multi-stage search, in that multiple pairs of values of gamma and knee parameters are tested. Note that in the embodiment described above, the white and black levels are derived from the gamma and knee parameters by the parameter finder 130.

In FIG. 9, a set of nine permutations of gamma and knee parameters are initially tested across the full range of possible gamma and knee parameter values. In a real example, a higher number of permutations would be used; just nine are shown simply for clarity of the diagram. From these initial tests, a pair of parameters 290 giving the lowest difference (as detected by the difference evaluator 120) is selected, and (as shown on the right hand side of FIG. 9) a finer resolution set of parameter pairs is tested around the selected pair 290. This process can be repeated (if desired or if necessary) so as to arrive at the parameter pair giving the lowest difference from amongst the pairs tested.

As an alternative, the search can operate amongst parameters within a predetermined range (or a range selected by the operator) of the parameters in use by the CCR 30, or the search can operate in terms of offsets above and below the respective parameters currently in use by the CCR 30.

The search could stop when the first set of parameters that achieves a difference below the threshold is achieved, or the search could seek the lowest difference even where there are several parameter pairs that achieve a difference below the threshold.

It is noted that the colour component streams (for example red, green and blue) each have a respective parameter search.

The parameters calculated by the parts of the apparatus described above accordingly represent the output of a colour property adjustment detector which detects degrees of colour property adjustment required to adjust one of the pair of images so as to reduce differences in colour properties between the pair of images.

Once a set of parameters has been found by the techniques described above, the set of parameters is used to derive a single difference figure Diff as an output of the apparatus. The way in which this is done will now be described with reference to FIGS. 3 and 10. This therefore provides the remaining part of the operation of a difference detector which derives a difference amount dependent upon an average of the degrees of colour property adjustment at each of a set of possible image colours, weighted by the image content of at least one of the pair of images at that respective image colour.

The final set of parameters derived by the parameter finder and accepted by the thresholding process described above is passed to the reference difference calculator 150. This calculates the differences between the correction curve corresponding to that set of parameters and a reference curve.

Figure 10:
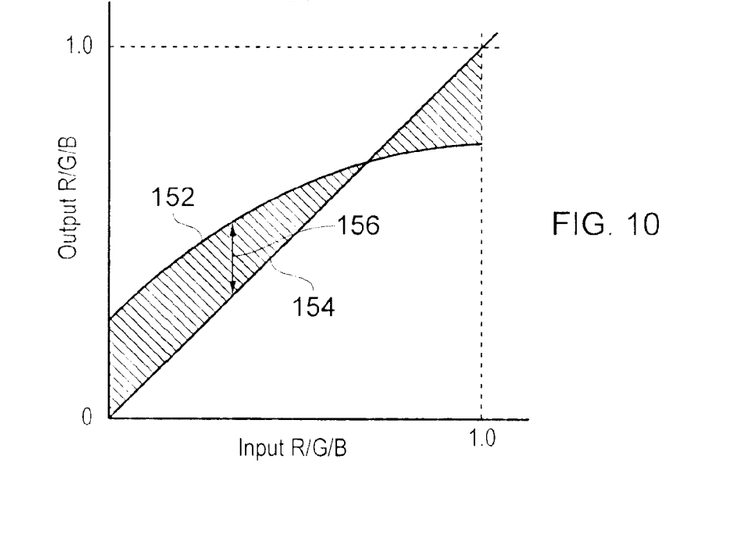
FIG. 10 schematically illustrates the difference between a correction curve and a reference curve.

The derivation of the correction curves was described above with reference to FIG. 8. An example of a curve 152 relating to the finally accepted set of correction parameters is shown in FIG. 10. Note that this is one of three curves, for the R, G and B signals respectively, which define the differences as derived by the apparatus of FIG. 3 between corresponding images of the L and R channels.

At each video signal value (shown in FIG. 10 as being normalised, from a range of 0 to 1023 for 10 bit video to a normalised range from 0 to 1) the difference in output video signal value between the correction curve 152 and a reference curve 154 is evaluated. In other words, this is the difference between that image colour and an output colour which would be generated by application of the colour property adjustment to that image colour. Note that each set of video signal values, across the three colour signals, represents a different image colour. In embodiments of the invention, all possible image colours are considered as part of this process. However, a subset of image colours could be used.

Note that the reference curve used in the example of FIG. 10 is a straight line of gradient 1, passing through the origin. That is to say, the reference curve represents the situation where no correction is applied. Accordingly, the differences 156 between the correction curve 152 and the reference curve 156 simply represent the amount of correction, expressed on the same scale as the video signal values, to be applied at each video signal value.

Different reference curves could of course be used.

The output from the reference difference calculator 150 comprises three series of values, one series for each colour signal (R, G, B), each series representing successive differences between the correction curve 152 and the reference curve 154 at each possible video signal value. These series of values are applied as inputs to the weighted average calculator 160.

The weighted average calculator combines the series of differences between the correction curve 152 and the reference curve 154 with the R histogram generated (in respect of the most recent iteration of the system) by the histogram generator 110.

In particular, for each possible video signal value, the weighted average calculator 160 evaluates the equation:

$$\text{weighted\_difference}_i = \text{ABS}(CC(\text{colour}_i) - \text{Ref}(\text{colour}_i)) \times \text{Hist}(\text{colour}_i)$$

where ABS indicates the absolute value, CC(colour) represents the correction curve value at that colour, Ref(colour) represents the reference curve value at that colour and Hist (colour) represents the histogram value at that colour.

The weighted average calculator 160 sums all of the weighted_difference values for each of the colours, which is to say that one Diff value per colour is generated. Of course, in an alternative embodiment, a single Diff value based on a weighted average across all three colours could be generated. The weighted average calculator 160 then divides the sum by the number of such values:

$$Diff = \frac{\sum_{i=1}^{i=num\_val} \text{weighted\_difference}_i}{num\_val}$$

The output value Diff represents a single value amount indicative of the qualitative difference in colour properties between images of the two video streams.

The signal Diff therefore represents a single value indicative not only of the differences in colour properties between a pair of images, but with a weighting so that colour property differences at colours which actually appear within one or both of the images have a greater effect on the value Diff which is derived.

The Diff output can be used as part of a quality monitoring apparatus for assessing (for example) an incoming 3D video stream.

Figure 11:
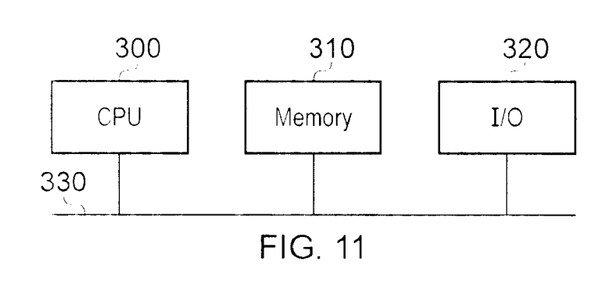
FIG. 11 schematically illustrates a data processing apparatus.

The system described above could be implemented in hardware, programmable or custom hardware (such as application specific integrated circuit(s) or field programmable gate arrays, and/or a data processing apparatus operating under software control. FIG. 11 schematically illustrates such a data processing apparatus comprising a processor (CPU) 300, memory such as program memory and data memory 310, and input/output device(s) 320, all interconnected by a bus arrangement 330. Suitable software is supplied via a non-transitory machine-readable storage medium such as an optical disc (not shown) and/or via a network or internet connection (not shown). It will be appreciated that in the case of embodiments implemented using software, the software itself and the medium by which the software is supplied should be regarded as embodiments of the invention.

Thus, the foregoing discussion discloses and describes merely exemplary embodiments of the present invention. As will be understood by those skilled in the art, the present invention may be embodied in other specific forms without departing from the spirit or essential characteristics of the invention. Accordingly, the disclosure of the present invention is intended to be illustrative, but not limiting of the scope of the invention, as well as other claims. The disclosure, including any readily discernible variants of the teachings herein, defines, in part, the scope of the claim terminology such that no inventive subject matter is dedicated to the public.

The invention claimed is:

1. An image property detection apparatus for processing a pair of images representing different respective views of a scene to generate a colour property difference amount, the apparatus comprising:
    a difference detector configured to derive a difference amount dependent upon an average of differences in colour properties between the pair of images at each of a set of possible image colours, each of the set of possible image colours being weighted by image content of at least one of the pair of images at that respective image colour;
    an area selector configured to select an area of the image over which a histogram is to be calculated, such that the area is divided into pixel value bins; and
    a noise adder configured to add a noise signal to an output signal of the area selector such that pixels that are adjacent to a boundary of two bins are randomly placed into the bins on either side of the boundary.

2. The apparatus according to claim 1, comprising:
    a colour property adjustment detector configured to detect degrees of colour property adjustment required to adjust one of the pair of images so as to reduce the differences in colour properties between the pair of images;
    the difference detector being configured to derive the difference amount dependent upon an average of the degrees of colour property adjustment at each of the set of possible image colours, weighted by the image content of at least one of the pair of images at that respective image colour.

3. The apparatus according to claim 2, wherein the degree of colour property adjustment, at a particular image colour, represents a difference between that image colour and an output colour which would be generated by application of a degree of the colour property adjustment to that image colour.

4. The apparatus according to claim 2, wherein the colour property adjustment detector comprises:
a colour property detector arranged to detect colour properties of images captured by each of a plurality of image capturing devices;
the colour properties detected by the colour property detector represent a distribution of pixel brightness in each of a set of primary pixel colours.

5. The apparatus according to claim 4, wherein the colour properties detected by the colour property detector comprise, for each of the set of component pixel colours, a histogram of pixel brightness in that colour with respect to a set of brightness intervals.

6. The apparatus according to claim 5, wherein at least some of the brightness intervals encompass more than one possible pixel brightness value.

7. The apparatus according to claim 5, comprising a low pass filter for smoothing the histograms generated in respect of the pair of images prior to the detection of differences between the histograms.

8. The apparatus according to claim 4, wherein the colour property detector is arranged to detect colour properties in respect of a sub-area of each of the pair of corresponding images.

9. The apparatus according to claim 8, wherein the respective sub-areas of the pair of images are displaced with respect to one another so as to represent the same features of the scene.

10. The apparatus according to claim 1, wherein the set of possible image colours comprises all possible image colours.

11. A camera system comprising:
a pair of image capturing devices arranged with respect to one another so as to capture images representing different respective views of a scene; and
an image property detection apparatus for processing a pair of images representing different respective views of a scene to generate a colour property difference amount, the apparatus comprising
a difference detector configured to derive a difference amount dependent upon an average of differences in colour properties between the pair of images at each of a set of possible image colours,
an area selector configured to select an area of the image over which a histogram is to be calculated, such that the area is divided into pixel value bins, and
a noise adder configured to add a noise signal to an output signal of the area selector such that pixels that are adjacent to a boundary of two bins are randomly placed into the bins on either side of the boundary,
wherein each of the set of possible image colours being weighted by the image content of at least one of the pair of images at that respective image colour.

12. The camera system according to claim 11, wherein the image capturing devices are laterally displaced from one another, in a horizontal image direction, so as to generate respective three-dimensional image pairs.

13. The camera system according to claim 11, wherein the image capturing devices are video cameras.

14. An image property detection method for processing a pair of images representing different respective views of a scene, the method comprising the steps of:
deriving, with circuitry, a difference amount dependent upon an average of differences in colour properties between the pair of images at each of a set of possible image colours, each of the set of possible image colours being weighted by image content of at least one of the pair of images at that respective image colour;
selecting an area of the image over which a histogram is to be calculated, such that the area is divided into pixel value bins; and
adding a noise signal to an output signal of the circuitry such that pixels that are adjacent to a boundary of two bins are randomly placed into the bins on either side of the boundary.

15. A non-transitory computer-readable medium storing computer-readable instructions thereon, the computer-readable instructions when executed by a computer cause the computer to perform a method comprising:
deriving, with circuitry, a difference amount dependent upon an average of differences in colour properties between the pair of images at each of a set of possible image colours, each of the set of possible image colours being weighted by image content of at least one of the pair of images at that respective image colour;
selecting an area of the image over which a histogram is to be calculated, such that the area is divided into pixel value bins; and
adding a noise signal to an output signal of the circuitry such that pixels that are adjacent to a boundary of two bins are randomly placed into the bins on either side of the boundary.

16. The apparatus according to claim 1, wherein the apparatus is configured to:
carry out one or more trials of different colour property adjustment parameters; and
derive a set of parameters which results in a difference in colour properties below a predetermined threshold amount.

17. The apparatus according to claim 16, wherein the derived set of parameters is passed to a reference difference calculator circuitry that calculates the differences between a correction curve corresponding to the set of parameters and a reference curve.

18. The apparatus according to claim 5, wherein the histogram maps positive and negative differences between a corresponding histogram of the other image at different brightness intervals within each histogram.

19. The apparatus according to claim 18, further comprising:
a weighted average calculator configured to combine a series of differences between the correction curve and the reference curve with the generated histogram such that the weighted average calculator sums weighted difference values for each detected colour and divides the sum by the number of such values, such that $$Diff = \frac{\sum_{i=1}^{i=num\_val} weighted\_difference_i}{num\_val}$$

wherein, weighted_difference$_i$=ABS(CC(colour$_i$)−Ref(colour$_i$))×Hist(colour$_i$)

and wherein,
ABS indicates the absolute value, CC(colour) indicates the correction curve value at that colour, Ref(colour) indicates the reference curve value at that colour and Hist(colour) indicates the histogram value at that colour.

20. The apparatus according to claim 18, wherein the difference between the histograms is derived as a difference of an index number associated with a brightness interval peak in each histogram.

\* \* \* \* \*